US011477652B2

(12) United States Patent
Bilinski et al.

(10) Patent No.: US 11,477,652 B2
(45) Date of Patent: Oct. 18, 2022

(54) SYSTEM AND METHOD FOR DEFENDING UNMANNED AERIAL VEHICLES FROM HIJACK CYBER ATTACKS

(71) Applicant: The United States of America as represented by the Secretary of the Navy, San Diego, CA (US)

(72) Inventors: Mark Bilinski, Vista, CA (US); Gerald Thomas Burnette, San Diego, CA (US); Fred William Greene, San Diego, CA (US); Garrison Buckminster Price, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 471 days.

(21) Appl. No.: 16/694,737

(22) Filed: Nov. 25, 2019

(65) Prior Publication Data

US 2021/0160696 A1 May 27, 2021

(51) Int. Cl.
*H04W 12/12* (2021.01)
*H04W 12/122* (2021.01)
*G06T 11/00* (2006.01)
*B64C 39/02* (2006.01)

(52) U.S. Cl.
CPC ......... *H04W 12/122* (2021.01); *B64C 39/024* (2013.01); *G06T 11/00* (2013.01); *B64C 2201/027* (2013.01); *G06T 2200/24* (2013.01)

(58) Field of Classification Search
CPC ..... G06T 11/00; H04W 12/122; B64C 39/024
USPC .......................................................... 726/23
See application file for complete search history.

(56) References Cited

U.S. PATENT DOCUMENTS

| 11,129,135 B2 * | 9/2021 | Atungsiri .............. H04L 5/0048 |
| 11,233,978 B1 * | 1/2022 | Morrow .................. H04W 4/42 |
| 2020/0388017 A1 * | 12/2020 | Coffman ................ G06V 20/20 |

* cited by examiner

*Primary Examiner* — Thomas J Lett
(74) *Attorney, Agent, or Firm* — Naval Information Warfare Center, Pacific; Kyle Eppele; Matthew D. Pangallo

(57) ABSTRACT

The system and methods described herein aids in the defense of unmanned vehicles, such as aerial vehicles, from wifi cyber attacks. Such attacks usually do not last long and in the case of many point-to-point command and control systems, the attacks originate from close proximity to the unmanned vehicle. The system and methods described herein allow a team to rapidly identify and physically respond to an adversary trying to take control of the unmanned vehicle. Another aspect of the embodiment taught herein is to allow for the location of a wifi signal in a hands-free manner by able to visualize the source of the signal using an augmented reality display coupled to an antenna array.

20 Claims, 2 Drawing Sheets

SYSTEM AND METHOD FOR DEFENDING UNMANNED AERIAL VEHICLES FROM HIJACK CYBER ATTACKS

FEDERALLY-SPONSORED RESEARCH AND DEVELOPMENT

System and Method for Defending Unmanned Aerial Vehicles from Hijack Cyber Attacks is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 110225.

BACKGROUND

There is a lot of work being done in terms of disabling or taking over unmanned aerial vehicles (UAVs) as well as defending a UAV from such efforts. For example, a net can be fired against a UAV to ensnare its propellers. One counter to this attack is to install cages around propellers. Another type of UAV attack is in the general category of wifi hijack attack. Many UAVs use the wifi band 2.4 gigahertz (GHz) for the command and control of the UAV. Depending on the software of the ground control station and the UAV, various vulnerabilities exist and these evolve with time. Typical approaches are to more securely design the software of the systems to prevent particular vulnerabilities. While taking security measures is good practice, one cannot defend against a previously unknown software vulnerability. The vulnerabilities and their solutions are very particular to the software and platform in question, so each such solution is very specific and does not necessarily extend to other such UAVs or even closely related wifi hijacking problems.

The common feature of these attacks is that they need to communicate with the UAV (or other specific platform being used) via the command and control frequency and thus need to emit and receive from the UAV. The UAV is limited in range to transmit back, so the operational range for a hijack attack is relatively close by. There remains a need for detecting such an attack and being able to physically respond to disable it.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1:
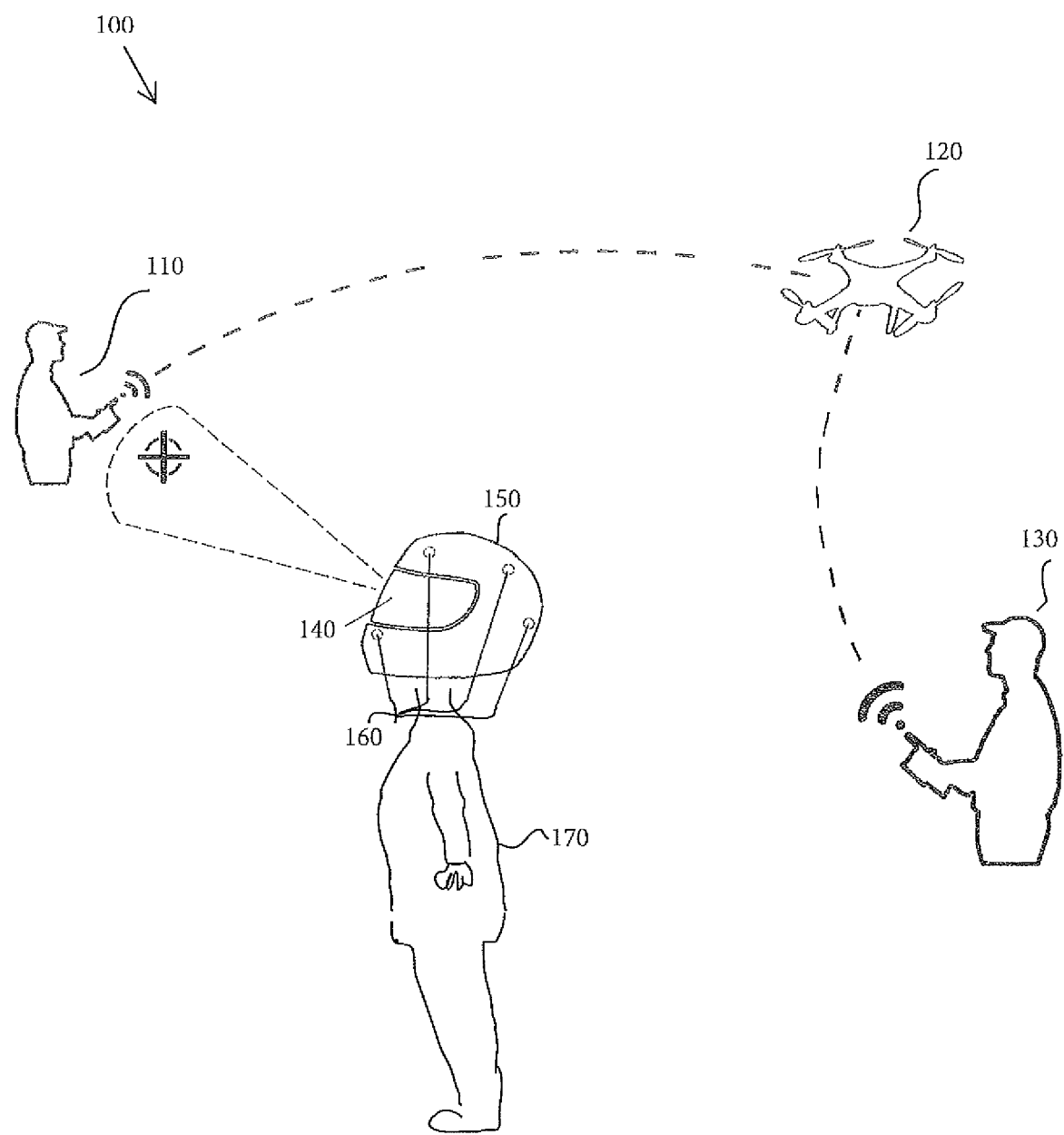
FIG. 1 shows a system for defending an unmanned vehicle from a hijack cyber attack.

FIG. 1 shows an embodiment of a system 100 for defending an unmanned vehicle from a hijack cyber attack. System 100 can be used for any unmanned system such as air, ground, surface, and underwater that is controlled by a radio frequency (RF) signal. System 100 can also be used for detecting rogue wife routers in a building. For the embodiment discussed herein, a hijack cyber attack comes in the form of a hostile RF Command and Control Link 110 against an unmanned aerial vehicle (UAV) 120. UAV 120 serves as a vulnerable target in need of defense. UAV 120 is remotely operated by an operator 130, thus operator 130 is not in physical control of UAV 120 during a cyber attack. An attack can be initiated at some point during UAV 120 operation while it is up in the air away from operator 130. A cyber attack will likely exploit a software vulnerability through the RF Command and Control link 110.

System 100 comprises a visor 140 coupled to a helmet 150, together which form a headset. Visor 140 acts as an augmented reality device through which matching frequency emitters to UAV 120 can be displayed. The augmented reality device is to overlay a user's field of view via visor 140 with helpful information, in effect a heat map of signal strength and a rendition of the approximate location of the source. An antenna array 160 comprising a plurality of antennas will be coupled to helmet 150 to allow for direction and position finding. Antenna array 160 is used to determine the direction and position of a radio frequency signal.

Alternatively, instead of using a visor 140 and helmet 150, visor 140 could be replaced with augmented reality glasses, eliminating the need for a helmet (not shown in the figure). In that embodiment, antenna array 160 would have to be placed in an alternate location instead of on a helmet, such as coupled to the dashboard of a vehicle.

Turning back to FIG. 1, a user 170 will wear helmet 150 while UAV 120 is in operation. User 170 will be able to rapidly identify whether a rogue signal exists, and where it is coming from. System 100 will allow user 170 to have hands-free operation, helping to respond to the source of an attack. For example, user 170 could be on a moving vehicle such as a motorcycle, which will allow user 170 to follow UAV 120 or drive to a designated location where the user can physically disable an attacker and/or device. Alternatively, user 170 can direct a RF signal at the attacker to jam the hostile transceiver, or it can respond kinetically from a distance. Once the source of the attack is removed, operator 130 of UAV 120 should be able to regain control.

Alternatively, antenna array 160 could also be coupled to a motorcycle or vehicle itself as opposed to a helmet, and the motorcycle or vehicle windshield or dashboard acting as the augmented reality display. Finally, a tablet could be used as the augmented reality display, however this will make hands-free operation challenging.

Figure 2:
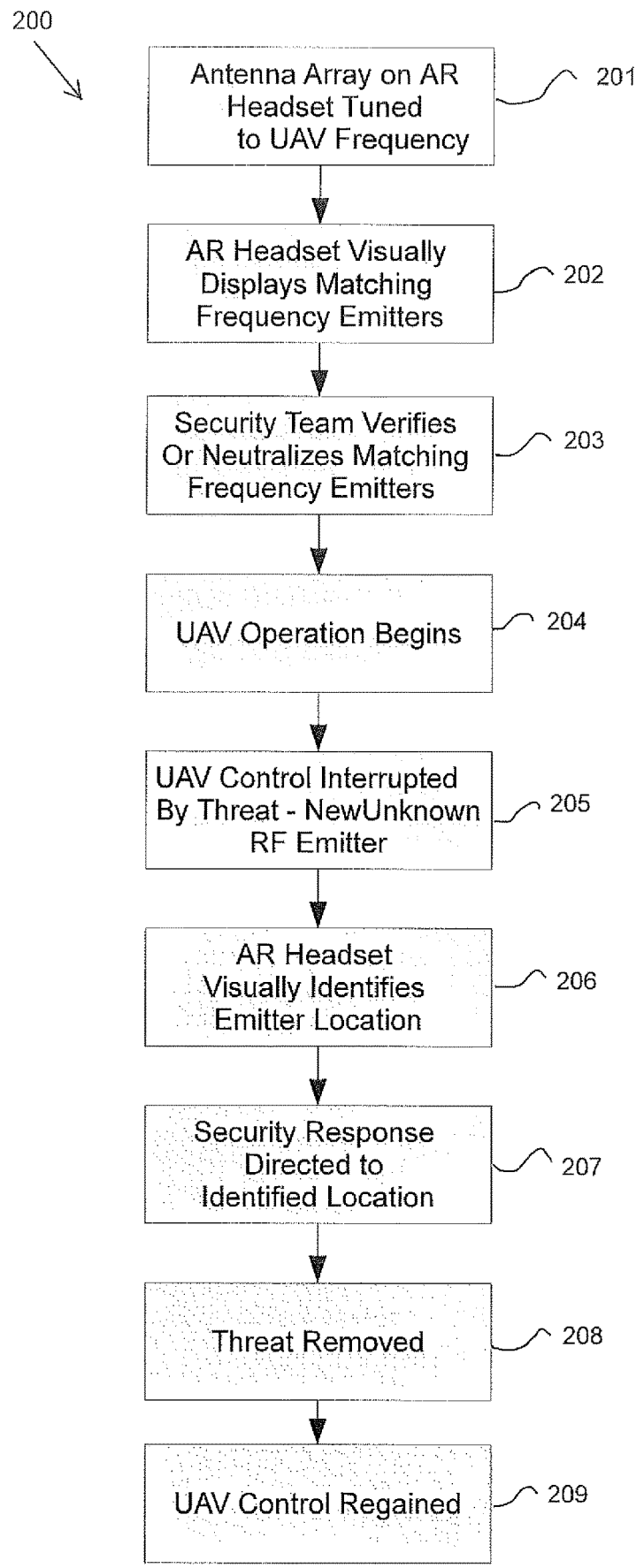
FIG. 2 shows a method for defending an unmanned vehicle from a hijack cyber attack.

FIG. 2 shows a flow chart demonstrating a method 200 for defending an unmanned aerial vehicle from a hijack cyber attack. For method 200, step 201 comprises tuning an antenna array coupled to an augmented reality (AR) headset to the radio frequency of a designated unmanned vehicle. For step 202, the AR headset visually displays matching radio frequency emitters to the designated unmanned vehicle. For step 203, a security team verifies or neutralizes the matching radio frequency emitters.

For step 204, an operator begins operation of the unmanned vehicle. For step 205, the operator's control of the unmanned vehicle is interrupted by a new unknown radio frequency emitter. For step 206, the AR headset visually identifies the unknown emitter location. For step 207, a security response is directed to the identified location. For step 208, the threat is removed. The threat can be removed in multiple ways. For example, the threat can be removed by physically disabling an attacker and/or device. Alternatively, a radio frequency signal can be directed at the unknown emitter to jam the hostile transceiver, or it can respond kinetically from a distance such as through physical contact. For step 209, the threat is removed. For step 210, control of the unmanned vehicle is regained.

Both system 100 and method 200 can be used as a second line of defense against a variety of hijack attacks. They can also be used to detect rogue wifi routers in other locations, such as office buildings or airports. In addition, although the embodiment envisioned for system 100 teaches an unmanned aerial vehicle, system 100 could also be used for unmanned vehicles on land or under water. Unmanned underwater vehicles could raise an antenna once they reach the surface and the system would work in the same way as aerial or land-based vehicles using radio frequency signals. The augmented reality display can also be changed.

Preferred embodiments are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for defending an unmanned vehicle comprising:
    an unmanned vehicle emitting a specific radio frequency;
    an antenna array configured to be tuned to the unmanned vehicle's specific radio frequency;
    an augmented reality display configured to display frequency emitters that match the unmanned vehicle's specific radio frequency;
    a defender, wherein the defender has the capability to view the augmented reality display.

2. The system of claim 1, wherein the augmented reality display is configured to allow the defender to visually identify a threat directed at the unmanned vehicle.

3. The system of claim 2, wherein the threat is a hostile radio frequency command and control link.

4. The system of claim 3, wherein the defender has the capability to remove the threat.

5. The system of claim 4, wherein the threat is removed by directing a radio frequency signal to jam the hostile radio frequency command and control link.

6. The system of claim 4, further comprising a motor vehicle, wherein the motor vehicle is operated within a specific distance of the unmanned vehicle by the defender.

7. The system of claim 6, wherein the antenna array is coupled to a headset, the headset configured to be worn by the defender.

8. The system of claim 7, wherein the headset further comprises a visor and a helmet, and wherein the augmented reality display is configured to be shown through the visor.

9. The system of claim 8, wherein the threat is removed using physical force.

10. The system of claim 1, wherein the unmanned vehicle is an aerial vehicle.

11. A method for defending an unmanned vehicle from a hijack cyber attack comprising the steps of:
    operating an unmanned vehicle emitting a specific radio frequency;
    tuning an antenna array to match the radio frequency of the unmanned vehicle;
    configuring an augmented reality display to allow visualization of the radio frequency emitters;
    verifying and neutralizing the matching radio frequency emitters;
    further configuring the augmented reality display to visually detect and identify the location and position of a threat, wherein the threat has the ability to wirelessly gain control of the unmanned vehicle;
    directing a security response to the identified threat;
    removing the threat;
    allowing continued operation of the unmanned vehicle.

12. The method of claim 11, further comprising removing the threat using a non-kinetic force.

13. The method of claim 11, further comprising the steps of coupling the antenna array to a motor vehicle having a windshield, and
    using the windshield as the augmented reality display.

14. The method of claim 11, further comprising the step of coupling the antenna array to a helmet having a visor, the visor configured to act as the augmented reality display.

15. The method of claim 14, further comprising the step of allowing a defender to wear the helmet while operating a motor vehicle within a specific distance of the unmanned vehicle.

16. The method of claim 15, wherein the threat is removed using physical force.

17. A method for neutralizing a hostile radio frequency emitter comprising the steps of:
    tuning an antenna array coupled to an augmented reality headset to a specific platform emitting radio frequency signals, wherein the antenna array is configured to determine the direction of radio frequency signals;
    configuring the augmented reality headset to visually display matching frequency emitters;
    verifying and neutralizing the matching radio frequency emitters;

allowing operation of the specific platform;
interrupting the operation of the specific platform using a threat, wherein the threat is a hostile radio frequency emitter;
using the augmented reality headset to visually identify the threat location;
directing a security response to the identified threat;
removing the threat;
allowing continued operation of the specific platform.

18. The method of claim 17, further comprising the step of using an unmanned vehicle as the specific platform.

19. The method of claim 18, further comprising the steps of allowing a user to wear the headset while operating a motor vehicle, and
allowing for hands-free identification of the threat.

20. The method of claim 17, further comprising the step of using a wifi router as the specific platform.

* * * * *